July 16, 1963 P. AIGRAIN 3,098,168

HOT ELECTRON COLD LATTICE SEMI-CONDUCTOR CATHODE

Filed March 20, 1959 2 Sheets-Sheet 1

July 16, 1963 P. AIGRAIN 3,098,168

HOT ELECTRON COLD LATTICE SEMI-CONDUCTOR CATHODE

Filed March 20, 1959 2 Sheets-Sheet 2

United States Patent Office 3,098,168

Patented July 16, 1963

3,098,168

HOT ELECTRON COLD LATTICE SEMI-CONDUCTOR CATHODE

Pierre Aigrain, Paris, France, assignor to Compagnie Generale de Telegraphie Sans Fil, a corporation of France Filed Mar. 20, 1959, Ser. No. 800,820
Claims priority, application France Mar. 24, 1958
9 Claims. (Cl. 313—346)

The present invention relates to a new type of thermo-electronic cathode which will be hereinafter referred to as a "hot electron cold lattice semi-conductor cathode."

In conventional thermionic cathodes of the oxide type there exist semiconductor layers of alkaline-earth oxides and the electronic emission may be considered as resulting from the fact that energy imparted to ions due to the heating of the semiconductor lattice, consequent to the heating of the cathode, is transmitted to free electrons, certain of which thus acquire an energy higher than the external work function $\psi$ necessary for the extraction thereof from the semiconductor.

The emission is thus tied in conventional thermionic cathodes to the heating of the cathode and these cathodes are therefore called "hot cathodes," the lattice generally being at a temperature slightly higher than that of the free electrons. This results in certain limitations which will be mentioned hereinafter and which it is an object of this invention to eliminate.

A cathode according to the invention comprises means for subjecting the free electrons present in an impurity containing semiconductor, which is preferably of the n-type, to a high electric field which communicates thereto an energy sufficient for bringing about the emission. It may thus be said that in a cathode according to the invention the electrons are "hot," whereas the lattice remains cold. A cathode according to the invention comprises a semiconductor in which the minimal energy $E_c$ necessary for providing electron-hole pairs, which will be hereinafter referred to as the "critical energy," is only slightly lower or is higher than the external work function.

Preferably the semiconductor is an element or is a compound of a monovalent, bivalent or trivalent metal and of a tetra, penta or hexavalent metalloid or metal.

Preferably, the metal has an atomic weight higher than 70, the electrons of the corresponding semiconductor having in this case a high mobility.

Among the semiconductors which are preferably used according to the invention are the following: Si, SbIn, InAs, InP, GaAs, SiC, $Mg_2Ge$, SiC, $Mg_2Sn$, $Mg_2Si$, $Cs_3Sb$, and $Na_3Sb$, this list being by no means limitative.

In a first embodiment a cathode according to the invention comprises a very thin wafer of a semiconductor selected according to the above indications, the semiconductor being doped to present a sufficient degree of n-type conductivity and, in contact with the wafer, two conductive electrodes, respectively secured on its faces and between which prevails an electric field, which is substantially perpendicular to the surfaces of the wafer.

According to a particular embodiment of the invention, one of the electrodes is a metal plate, having fins or another cooling arrangement for maintaining the semiconductor at the ambient temperature, the other electrode being a metal grid between the meshes of which electrons are emitted by the semiconductor.

The metal grid may also be substituted by a very thin, semi-transparent electrode, having a thickness of, for example, about 50 A, consisting of a substance having a very low external work function $\Phi$, for instance lower than 2 e.v.

According to a further embodiment, the cathode comprises a very thin wafer of a semiconductor, selected according to the above indications, which is doped to present a sufficient degree of n-type conductivity, the wafer being in contact on one of its faces with two conductive electrodes insulated from each other and forming, for example, two interdigitated structures between which prevails an electric field parallel to the emissive surface.

The invention will be best understood from the ensuing description and appended drawing, wherein.

Figure 1:
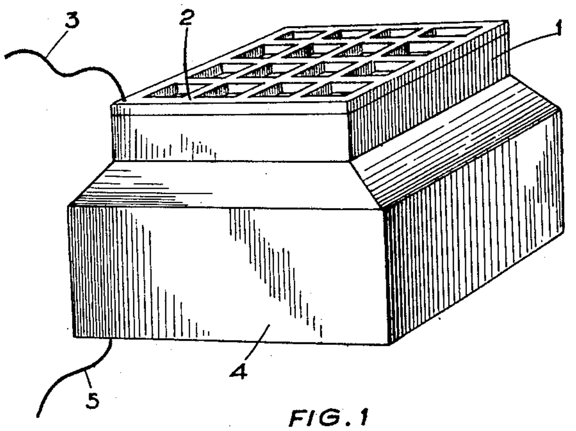
FIG. 1 illustrates schematically a cathode according to the invention.

Referring to FIG. 1, a wafer 1 of a semiconductor having the n-type conductivity, for example of one of the semiconductors listed above, and presenting an exposed area of, for example, a few square millimeters and a thickness of about .1 mm., carries on its upper face a metal grid 2, connected to a current supply lead 3. Grid 2 may be obtained, for instance, by depositing nickel on the semiconductor by vacuum evaporation, the meshes being obtained by a photo-etching process.

These meshes are as fine and transparent as possible, the sides thereof being, for instance, of the order of a few tens of microns, it being of course understood that these values are in no way limitative.

Wafer 1 is secured, by its lower face, to a block 4, for example a few tenths of a millimeter thick, connected to a power supply lead 5. Block 4 may carry cooling fins (not shown) adapted to maintain wafer 1 at the ambient temperature during the electron emission. Grid 2 and block 4 are the two electrodes which, once connected to an electric source, supply the electric field which is necessary for the operation of the cathode.

Figure 3:
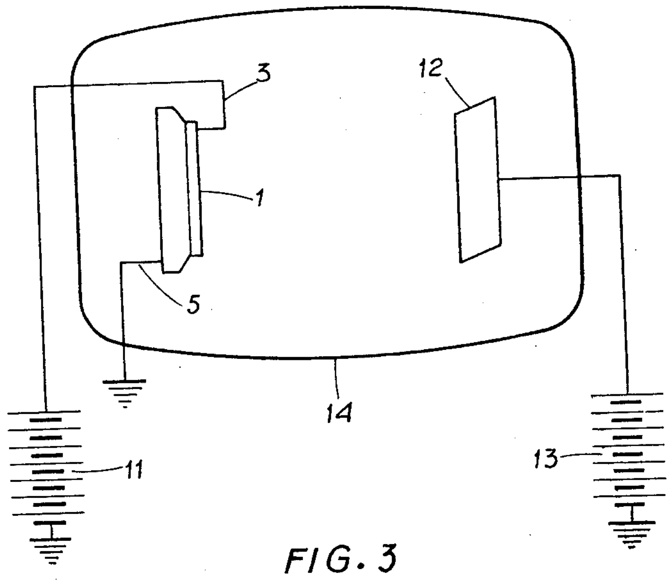
FIG. 3 illustrates schematically a diode arrangement comprising a cathode according to the invention.

Upon connecting between conductors 3 and 5 an electric power supply 11 (FIG. 3) for applying a potential difference of say one or several hundreds volts between the two surfaces of wafer 1, and if, for example, a conventional diode type arrangement is established with its anode formed, for instance, by a tantalum sheet 12 brought to a potential of one or several hundreds volts with respect to the cathode, provided by a source 13, the whole assembly being enclosed in an evacuated envelope 14, a high current flow, of the order of several hundreds of amperes per $cm.^2$, will be observed between the anode and the cathode. This current keeps flowing without any substantial increase in the semiconductor temperature. Preferably, any increase in the semiconductor temperature is prevented by means of any suitable cooling system. Cooling fins, with which plate 4 may be provided as indicated above, may contribute to the cooling of the cathode which is in any case insured by the large exposed surface areas of the cathode structure.

The observed electron emission is thus of a nature which is thoroughly different from that which takes place in hot cathodes and its existence can be explained as follows: the free electrons existing within the semiconductor wafer 1 are subjected to a field of several kv./cm. They will thus acquire an energy corresponding to "electronic temperatures" of several thousands degrees K. and will thus be emitted by the semiconductor through the meshes of grid 2.

Because of the poor thermal coupling between the free electrons and the semiconductor lattice, the temperature of the latter is not substantially increased. Besides, care is taken that the thermal resistance between the network and the ambient atmosphere should be much smaller than the thermal resistance between the electrons and the lattice. This result is obtained in the example illustrated by using, for building up the cathode, a solid block 4 of substantial dimensions.

A cathode according to the invention has the following advantages:

(1) Long useful life: it is known that the operating of conventional cathodes at a high temperature causes them to age and poisons them by oxidation, which is enhanced by the high temperatures of the lattice. These disadvantages are eliminated in cold lattice cathodes of the invention.

(2) High emissive power: in conventional cathodes, emission is limited on account of the fact that excessive heating may cause the destruction of the substance forming the cathode. This drawback is completely eliminated by the invention.

(3) Possibility of using substances, such as silicon, having a high external work function: at temperatures which would make it possible for a conventional type cathode formed of silicon to emit, silicon would be vaporized or melted.

(4) Possibility of using such compounds as, for example, $Cs_3Sb$, the work function of which is very small but which vaporize, melt or decompose at a comparatively low temperature. This is of particular interest in low noise tubes, since these compounds emit at a comparatively low electronic temperature, for instance at 650° K., thus reducing speed fluctuations of the electrons.

While selecting the semiconductor substance for the cathode the indications given in column 1 of the specification must be closely followed. These indications are based on the following remarks:

It is known that, in semiconductors, high speed electrons are capable of producing by collision electron-hole pairs. They will thus tend to lose rapidly their energy, thereby limiting the emissive power.

According to an essential feature of the invention, those semiconductors will be used whose critical energy $E_c$ is not substantially lower or is higher than their external work function $\Phi$. Under such conditions the production of the electron hole pairs will be negligible and no substantial decrease of the emissive power will result.

An empirical relation is known to exist between the critical energy $E_c$ and the energy gap $E_g$ of the semiconductors, the latter corresponding to the width of the forbidden band, namely $$E_c=2+\frac{E_g}{2}$$

energy being expressed in electron volts. Accordingly, a first group of semiconductors which should preferably be used according to the invention will consist of semiconductors the external work function of which is at most equal to 2 electron volts. Such is, in particular, the case of compounds such as BaO, $Ba_2Si$, $M_3Sb$, M designating a monovalent metal such as caesium.

A second group of semiconductors, which should preferably be used in accordance with the invention, comprises semiconductors whose external work function may be reduced to a sufficiently low value by means of a suitable surface treatment. Such treatment may, for example, consist in the adsorption of an alkaline substance, such as caesium: silicon or indium antimonide, treated in this way, are of a convenient use for providing a cathode according to the invention.

A third group of semiconductors which should be preferably used in a cathode according to the invention comprises semiconductors, such as ZnSe or ZnTe, having a high energy gap.

The semiconductors listed above are selected from these three groups, taking into account various considerations, in particular the fact that the electron mobility must be high.

In order to be used in a cathode according to the invention, these semiconductors must of course present the n-type conductivity, which generally requires a suitable doping, as is well known in the art: for instance silicon may be doped by lithium.

In determining the degree of the n-conductivity a compromise must be made between two contradictory requirements. An excessive doping will result in a too low electron mobility, which will entail the necessity of applying a high intensity field in order to cause the cathode to emit. However, it is necessary to have a sufficient amount of free electrons to obtain an intensive emission. As a matter of fact, the semiconductor should be doped rather intensively, since electrons once "hot" are little sensitive to impurities.

After these general considerations relative to the operation of the cathode according to the invention and to the selection of the semiconductors for the manufacture thereof, reference will be made again to the embodiments illustrated in the drawing.

Referring to FIG. 1, the electric field prevailing within the semiconductor and resulting from the application of a potential difference between electrodes 2 and 4 is perpendicular to wafer 1. The latter is therefore an equipotential surface and this makes it possible to emit homokinetic electrons from the various points of the exposed surface of wafer 1, which generally is the result desired in vacuum tube techniques.

Figure 2:
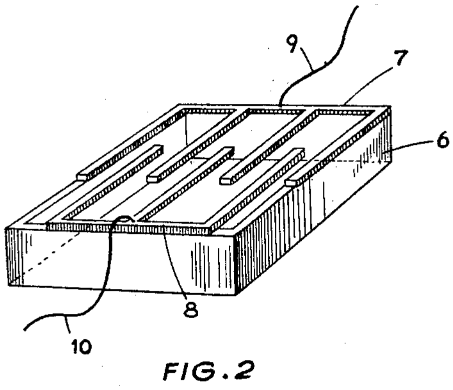
FIG. 2 illustrates schematically another cathode according to the invention.

The cathode of FIG. 2 comprises a thin semiconductor wafer 6 and two conductive interdigitated elements 7 and 8 in contact with one of the faces of wafer 6 and connected to an electric energy supply through conductors 9 and 10. In this case, the emissive surface of the cathode is not equipotential, which limits its application. Such a cathode may be used, for instance, in certain variable-$\mu$ tubes or in crossed-field tubes.

However, this cathode arrangement offers certain advantages. Since the field is applied parallel to the surface of the semiconductor, the electrons will become hot only in the close proximity of the emissive surface, for example within a layer a few microns thick, and, therefore, they will leave the cathode in a very short time. Losses due to the impact of electrons on the lattice are thus avoided. Such losses would bring about an increase of the temperature of the lattice at the expense of a voltage drop in the semiconductor. The interdigital structure makes it possible to obtain an electric field having a sufficient intensity with an acceptable potential difference between adjacent fingers respectively pertaining to the two combs which build up the structure, while providing a cathode with a substantial emissive surface by using a comb structure having a substantial number of fingers.

It is to be understood that the embodiments described are in no way limitative.

It has been found in particular that a cathode as illustrated in FIGS. 1 and 2 is capable of operating with current densities sufficiently high for continuing to emit even after the termination of a single thermalization pulse which has been applied to electrodes 2 and 4, or 6 and 7, without resorting to any continuous thermalization voltage. The emission discontinues only upon suppression or sufficient decrease in the anode voltage.

It may be assumed in this case that the thermalization electric field is produced by the high electronic current in the semiconductor body.

It will therefore be possible to use this type of cathode in rectifier or mutator tubes, similar to the cathode-spot gas discharge tubes: the main advantage of the cathode according to the invention in this particular application is that no deionizing time will restrict its operating frequency.

The invention contemplates also the application of the device to any tube presently using conventional hot cathodes.

The density of the saturation current of the cathode according to the invention is, in fact, the higher as the semiconductor is more impure, the impurity being however limited, according to the general considerations discussed above in the present specification.

This density may further be adjusted by controlling the thermalization voltage. It is thus, possible to adjust the density of the saturation current to values such that the emission should no longer be sufficient to ensure the self-thermalization of the cathode.

What is claimed is:

1. A cold cathode structure comprising an emissive body having a single zone of one conductivity type impurity containing semiconductor material having an exposed emissive surface, said cold cathode structure further comprising means for creating an electric field within said material for causing it to emit electrons from said exposed surface.

2. A cold cathode structure comprising an emissive body having a single zone of one conductivity type n-type semiconductor material having an exposed emissive surface, said cold cathode structure further comprising means for creating an electric field within said material for causing it to emit electrons from said exposed surface.

3. A cold cathode structure comprising an emissive body having a single zone of one conductivity type impurity containing semiconductor material having an exposed emissive surface, said material containing free electrons and having a lattice structure, and means for causing free electron within said body to become hot, the lattice staying cold.

4. A cold cathode structure comprising an emissive body having a single zone of one conductivity type n-type semiconductor material, the ratio between the critical energy and the external work function of which is at least substantially equal to one, said body having an exposed emissive surface, said cold cathode structure further comprising means for creating an electric field within said material for causing it to emit electrons from said exposed surface.

5. A cold cathode structure comprising an emissive body having a single zone of a semiconductor substance of the n-type having two faces, two metal electrodes insulated from each other and respectively in ohmic contact with said faces, and means for providing an electric field between said electrodes for causing said substance to emit electrons.

6. A cold cathode structure comprising an emissive body having a single zone of a semiconductor substance of the n-type having two faces, two metal electrodes insulated from each other and respectively in ohmic contact with said faces, means for providing an electric field between said electrodes for causing said substance to emit electrons, and means for cooling said emissive body.

7. A cold cathode structure comprising an emissive body having a single zone of a semiconductor substance of the n-type having two faces, a first electrode in the shape of a grid in ohmic contact with one of said faces, a second solid electrode in ohmic contact with the other face and means for providing an electric field between said electrodes for causing said substance to emit electrons.

8. A cold cathode structure comprising an emissive body having a single zone of a semiconductor substance of the n-type having two faces, a first electrode in the shape of a grid in ohmic contact with one of said faces, a second solid electrode in ohmic contact with the other face and means for providing an electric field between said electrodes for causing said substance to emit electrons, said second electrode comprising means for cooling said cathode structure.

9. A cold cathode structure comprising an emissive body having a single zone of a semiconductor substance of the n-type two comb shaped electrodes having fingers in contact with said emissive body, the fingers of said combs being interdigitated, and means for providing an electric field between said electrodes.

References Cited in the file of this patent

UNITED STATES PATENTS

| | | |
|---|---|---|
| 2,842,706 | Dobischek et al. | July 8, 1958 |
| 2,960,659 | Burton | Nov. 15, 1960 |

OTHER REFERENCES

"Electric Emission from Breakdown Regions in SiC p-n Junctions" L. Patrick et al., Physical Review Letters, vol. 2, No. 2, January 15, 1959.